(12) United States Patent
Hampel et al.

(10) Patent No.: US 9,414,285 B2
(45) Date of Patent: Aug. 9, 2016

(54) HANDOVER WITH INTEGRATED ANTENNA BEAM TRAINING IN WIRELESS NETWORKS

(71) Applicant: QUALCOMM Incorporated, San Diego, CA (US)

(72) Inventors: Karl Georg Hampel, New York, NY (US); Junyi Li, Chester, NJ (US); Vincent Douglas Park, Budd Lake, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 183 days.

(21) Appl. No.: 14/320,322

(22) Filed: Jun. 30, 2014

(65) Prior Publication Data

US 2015/0382268 A1     Dec. 31, 2015

(51) Int. Cl.
*H04W 36/00* (2009.01)
*H04W 36/24* (2009.01)
*H04B 7/06* (2006.01)
*H04W 36/14* (2009.01)

(52) U.S. Cl.
CPC ............. *H04W 36/24* (2013.01); *H04B 7/0617* (2013.01); *H04W 36/0072* (2013.01); *H04W 36/14* (2013.01)

(58) Field of Classification Search
USPC ............ 370/225, 330; 455/436, 562, 67.3, 82
See application file for complete search history.

(56) References Cited

U.S. PATENT DOCUMENTS

| 5,848,358 A | 12/1998 | Forssen et al. |
| 6,169,522 B1 | 1/2001 | Ma et al. |
| 8,422,961 B2 | 4/2013 | Kafle |
| 9,048,907 B2 * | 6/2015 | Chae .................... H04B 7/0404 |
| 2006/0240827 A1 | 10/2006 | Dunn et al. |
| 2013/0089000 A1 | 4/2013 | Hansen et al. |
| 2013/0155847 A1 | 6/2013 | Li et al. |
| 2013/0201959 A1 | 8/2013 | Guo et al. |
| 2013/0308717 A1 | 11/2013 | Maltsev et al. |

OTHER PUBLICATIONS

International Search Report and Written Opinion—PCT/US2015/035388—ISA/EPO—Oct. 16, 2015.

* cited by examiner

*Primary Examiner* — David Q Nguyen
(74) *Attorney, Agent, or Firm* — Arent Fox LLP

(57) ABSTRACT

A method, an apparatus, and a computer program product for sustaining a link with a wireless network are provided. The apparatus communicates data with the wireless network via a first link with a first base station, acquires a resource to perform a beam training sequence with a second base station, wherein the acquired resource allows the beam training sequence with the second base station to be performed while the data is communicated via the first link, performs the beam training sequence and exchanging signaling information with the second base station using the resource to establish a second link to the second base station, evaluates a link strength of the second link based on the beam training sequence, and determines whether to switch the data communication from the first link to the second link based on the evaluation.

30 Claims, 12 Drawing Sheets

HANDOVER WITH INTEGRATED ANTENNA BEAM TRAINING IN WIRELESS NETWORKS

BACKGROUND

1. Field

The present disclosure relates generally to communication systems, and more particularly, to enabling fast handover for access technologies that utilize narrow, link-specific antenna beam pairs.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

Wireless access technologies in the millimeter wave (mmW) range require narrow, path-specific antenna beams (e.g., pencil beams) to be communicated between end points to overcome high propagation loss and reduced multipath diversity. Due to a short wavelength and limited link margin in the millimeter wave, a wireless channel becomes sensitive to shadowing effects. Such shadowing effects may be mitigated via macro diversity. For example, a mobile terminal currently being served by a serving base station may handover to an alternative target base station when the link to the serving base station becomes impaired. Current mobility protocols, e.g., protocols defined by 3GPP or Internet Engineering Task Force (IETF), are generally too slow to follow fast shadowing effects. Moreover, according to the current mobility protocols, every handover operation in which the mobile terminal participates requires a training sequence to be conducted between the mobile terminal and the target base station to create a matching pencil beam pair, which adds to an overall handover delay. Accordingly, what is needed is a solution that enables fast handover for access technologies that utilize narrow, link-specific antenna beam pairs.

SUMMARY

In an aspect of the disclosure, a method, a computer program product, and an apparatus for sustaining a link with a wireless network are provided. The apparatus may be embodied in a UE that communicates data with the wireless network via a first link with a first base station, acquires a resource to perform a beam training sequence with a second base station, wherein the acquired resource allows the beam training sequence with the second base station to be performed while the data is communicated via the first link, performs the beam training sequence and exchanging signaling information with the second base station using the resource to establish a second link to the second base station, evaluates a link strength of the second link based on the beam training sequence, and determines whether to switch the data communication from the first link to the second link based on the evaluation.

DETAILED DESCRIPTION

Figure 1:
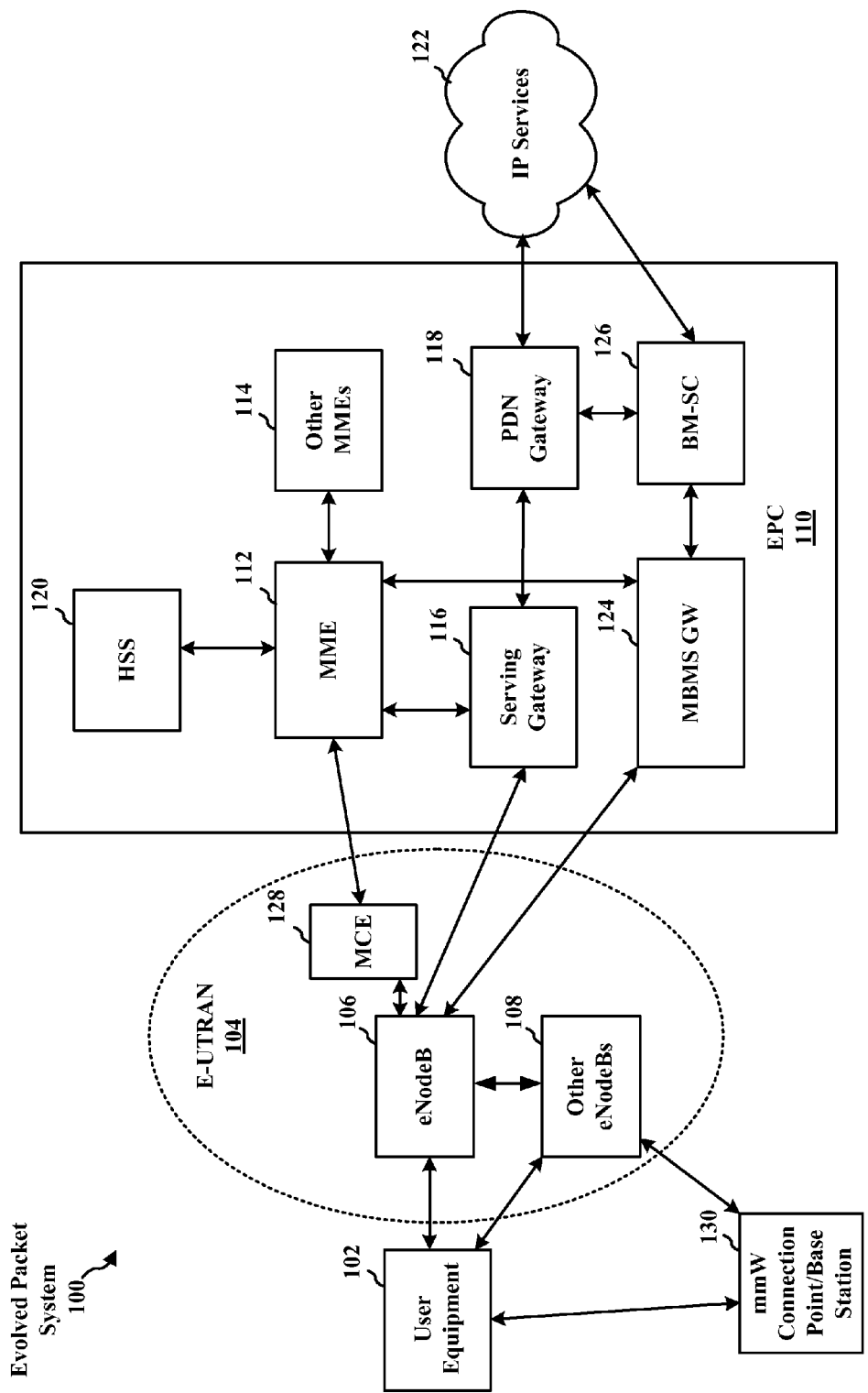
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

In an aspect, the UE 102 is capable of communicating signals via the LTE network and a millimeter wave (mmW) system. Accordingly, the UE 102 may communicate with the eNB 106 and/or the other eNBs 108 over a LTE link. Additionally, the UE 102 may communicate with a connection point (CP) or base station (BS) 130 (capable of mmW system communication) over a mmW link.

In a further aspect, at least one of the other eNBs 108 may be capable of communicating signals via the LTE network and the mmW system. As such, an eNB 108 may be referred to as a LTE+mmW eNB. In another aspect, the CP/BS 130 may be capable of communicating signals via the LTE network and the mmW system. As such, the CP/BS 130 may be referred to as a LTE+mmW CP/BS. The UE 102 may communicate with the other eNB 108 over a LTE link as well as over a mmW link.

In yet another aspect, the other eNB 108 may be capable of communicating signals via the LTE network and the mmW system, while the CP/BS 130 is capable of communicating signals via the mmW system only. Accordingly, the CP/BS 130 unable to signal the other eNB 108 via the LTE network may communicate with the other eNB 108 over a mmW backhaul link. Techniques for sustaining a link between a UE 102 and CP 130 in a directional wireless network such as EPS 100 is discussed in further detail infra.

Figure 2:
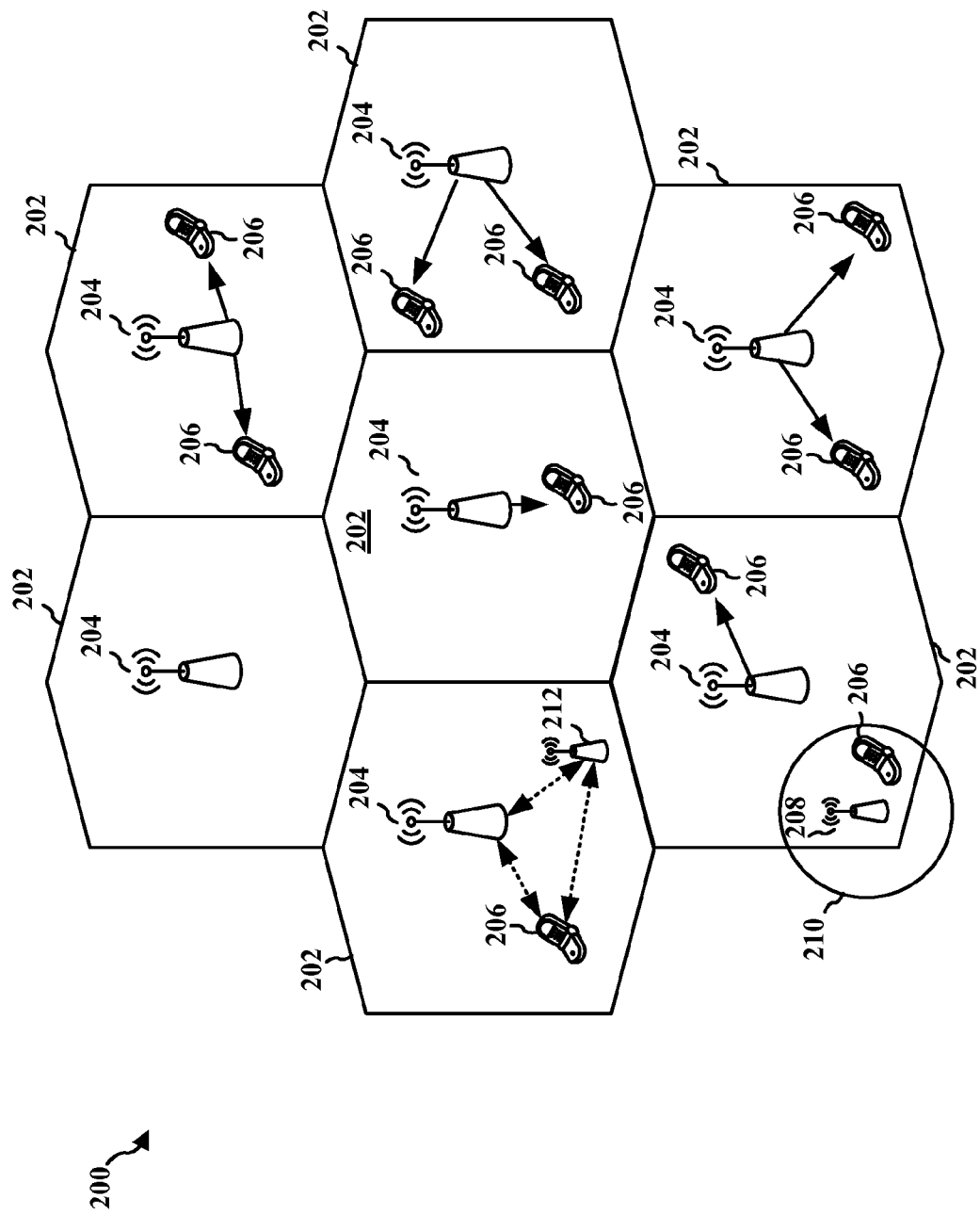
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

In an aspect, the UE 206 may communicate signals via the LTE network and a millimeter wave (mmW) system. Accordingly, the UE 206 may communicate with the eNB 204 over a LTE link and communicate with a connection point (CP) or base station (BS) 212 (capable of mmW system communication) over a mmW link. In a further aspect, the eNB 204 and the CP/BS 212 may communicate signals via the LTE network and the mmW system. As such, the UE 206 may communicate with the eNB 204 over a LTE link and a mmW link (when the eNB 204 is capable of mmW system communication), or communicate with the CP/BS 212 over a mmW link and a LTE link (when the CP/BS 212 is capable of LTE network communication). In yet another aspect, the eNB 204 communicates signals via the LTE network and the mmW system, while the CP/BS 212 communicates signals via the mmW system only. Accordingly, the CP/BS 212 unable to signal the eNB 204 via the LTE network may communicate with the eNB 204 over a mmW backhaul link.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
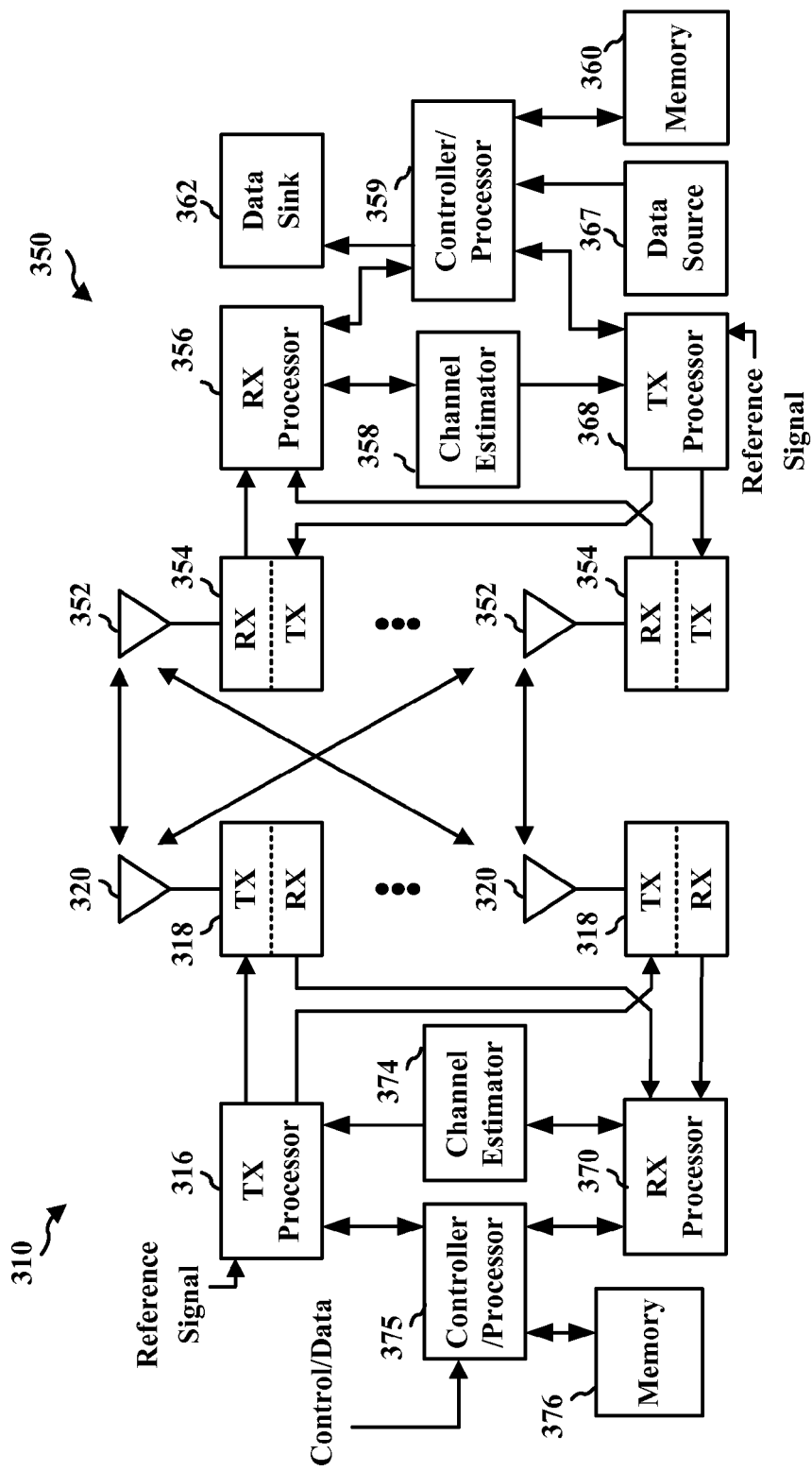
FIG. 3 is a diagram illustrating an example of an evolved Node B and user equipment in an access network.

FIG. 3 is a block diagram of an eNB 310 in communication with a UE 350 in an access network. In the DL, upper layer packets from the core network are provided to a controller/processor 375. In the DL, the controller/processor 375 provides header compression, ciphering, packet segmentation and reordering, multiplexing between logical and transport channels, and radio resource allocations to the UE 350 based on various priority metrics. The controller/processor 375 is also responsible for HARQ operations, retransmission of lost packets, and signaling to the UE 350.

The transmit (TX) processor 316 implements various signal processing functions. The signal processing functions include coding and interleaving to facilitate forward error correction (FEC) at the UE 350 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The RX processor 356 implements various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, control signal processing to recover upper layer packets from the core network. The upper layer packets are then provided to a data sink 362. Various control signals may also be provided to the data sink 362 for processing. The controller/processor 359 is also responsible for error detection using an acknowledgement (ACK) and/or negative acknowledgement (NACK) protocol to support HARQ operations.

In the UL, a data source 367 is used to provide upper layer packets to the controller/processor 359. Similar to the functionality described in connection with the DL transmission by the eNB 310, the controller/processor 359 provides header compression, ciphering, packet segmentation and reordering, and multiplexing between logical and transport channels based on radio resource allocations by the eNB 310. The controller/processor 359 is also responsible for HARQ operations, retransmission of lost packets, and signaling to the eNB 310.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the control/processor 375 provides demultiplexing between transport and logical channels, packet reassembly, deciphering, header decompression, control signal processing to recover upper layer packets from the UE 350. Upper layer packets from the controller/processor 375 may be provided to the core network. The controller/processor 375 is also responsible for error detection using an ACK and/or NACK protocol to support HARQ operations.

Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave (mmW). Near mmW may extend down to a frequency of 3 GHz with a wavelength of 100 millimeters (the super high frequency (SHF) band extends between 3 GHz and 30 GHz, also referred to as centimeter wave). While the disclosure herein references mmWs, it should be understood that the disclosure also applies to near mmWs. Further, while the disclosure herein refers to a mmW base station, it should be understood that the disclosure also applies to near mmW base stations. The millimeter wavelength RF channel has extremely high path loss and a short range. In order to build a useful communication network in the millimeter wavelength spectrum, a beam forming technique may be used to compensate for the extreme high path loss. The beam forming technique focuses the RF energy into a narrow direction to allow the RF beam to propagate farther in that direction. Using the beam forming technique, non-line of sight (NLOS) RF communication in the millimeter wavelength spectrum may rely on reflection and/or diffraction of the beams to reach the UE. If the direction becomes blocked, either because of the UE movement or changes in the environment (e.g., obstacles, humidity, rain, etc.), the beam may not be able to reach the UE. Thus, in order to ensure that the UE has continuous, seamless coverage, multiple beams in as many different directions as possible may be available.

Beam forming techniques and methods for sustaining a link between a mobile UE and a base station in continuously changing wireless environments is provided infra.

A motivation for LTE is to increase a cellular network bandwidth for a mobile data demand. As the mobile data demand increases, various other technologies may be utilized to sustain the demand. For example, high speed mobile data may be delivered using a millimeter wave (mmW) channel.

A mmW link may be defined as the delivery of baseband symbols from a transmitter capable of mmW beamforming to a receiver capable of mmW beamforming. A mmW resource unit may include a specific combination of a beam width, a beam direction, and a timeslot. The timeslot may be a fraction of a LTE subframe and aligned with a LTE physical downlink control channel (PDCCH) frame timing. To effectively increase a receive mmW signal strength without increasing transmission power at the transmitter, beamforming may be applied. A receiver gain may be increased by reducing the mmW beam width of either, or both, the transmitter and the receiver. For example, the beam width may be changed by applying phase shifting to an antenna array.

A mmW communication system may operate at very high frequency bands (e.g., 10 GHz to 300 GHz). Such high carrier frequencies allow for the use of large bandwidth. For example, a 60 GHz mmW wireless network provides large bandwidth at approximately a 60 GHz frequency band and has the ability to support a very high data rate (e.g., up to 6.7 Gbps). The very high frequency bands may be used for backhaul communications or for network access (e.g., UEs accessing a network), for example. Applications supported by the mmW system may include uncompressed video streaming, sync-n-go file transfer, video games, and projections to wireless displays, for example.

A mmW system may operate with the help of a number of antennas and beamforming to overcome a channel having low gain. For example, heavy attenuation at high carrier frequency bands may limit a range of a transmitted signal to a few meters (e.g., 1 to 3 meters). Also, the presence of obstacles (e.g., walls, furniture, human beings, etc.) may block the propagation of a high frequency millimeter wave. As such, propagation characteristics at the high carrier frequencies necessitate the need for beamforming to overcome the loss. Beamforming may be implemented via an array of antennas (e.g., phased arrays) cooperating to beamform a high frequency signal in a particular direction to receiving devices, and therefore, extend the range of the signal. While the mmW system may operate in a stand-alone fashion, the mmW system may be implemented in conjunction with more established but lower frequency (and lower bandwidth) systems, such as LTE.

In an aspect, the present disclosure provides for cooperative techniques between the LTE system and the mmW system. For example, the present disclosure may exploit the presence of a more robust system to help with beamforming, synchronization, or discovery of a base station. Cooperation between the mmW system and a lower-frequency system (e.g., LTE) may be facilitated by the following: 1) Types of signaling in support of discovery, synchronization, or association on a mmW channel can be sent over a different lower-frequency robust carrier; 2) Order of sending discovery and synchronization signaling between a mmW channel and a lower-frequency carrier (e.g., LTE); 3) Exploitation of existing connectivity; 4) Information to be included by base stations (BSs)/user equipments (UEs) in a transmitted message; and 5) Information to be included in LTE signaling.

In an aspect, mmW-capable connection points (CPs) or base stations (BSs) (network access points for mmW-capable devices) may be mounted on light poles, building sides, and/or collocated with metro cells. A mmW link may be formed by beamforming along a line of sight (LOS) or dominant reflected paths or diffracted paths around obstacles. A challenge of a mmW-capable device is to find an appropriate LOS or reflected path for beamforming.

Figure 4A:
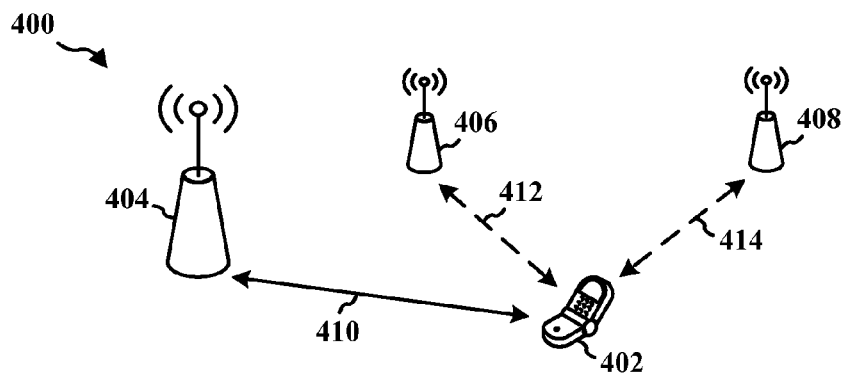
FIGS. 4A to 4C are diagrams illustrating example deployments of a mmW system used in conjunction with a LTE system.
Figure 4B:
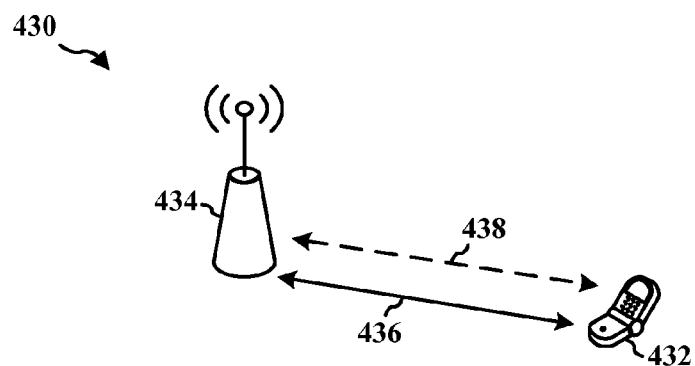
Figure 4C:
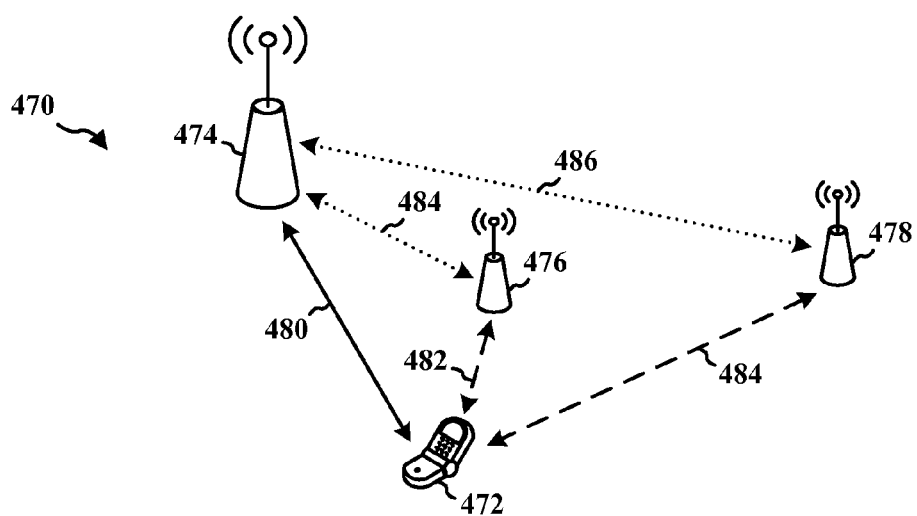

FIGS. 4A to 4C are diagrams illustrating example deployments of a mmW system used in conjunction with a LTE system. In FIG. 4A, diagram 400 illustrates a deployment where a LTE system operates independently of, and in parallel with, a mmW system. As shown in FIG. 4A, a UE 402 is capable of communicating signals via a LTE system and a mmW system. Accordingly, the UE 402 may communicate with a eNB 404 over a LTE link 410. In parallel with the LTE link 410, the UE 402 may also communicate with a first BS 406 over a first mmW link 412 and communicate with a second BS 408 over a second mmW link 414.

In FIG. 4B, diagram 430 illustrates a deployment where the LTE system and the mmW system are collocated. As shown in FIG. 4B, a UE 432 is capable of communicating signals via the LTE system and the mmW system. In an aspect, a BS 434 may be an LTE eNB capable of communicating signals via the LTE system and the mmW system. As such, the BS 434 may be referred to as a LTE+mmW eNB. In another aspect, the BS 434 may be a mmW CP capable of communicating signals via the LTE system and the mmW system. As such, the BS 434 may be referred to as a LTE+mmW BS. The UE 432 may communicate with the BS 434 over a LTE link 436. Meanwhile, the UE 432 may also communicate with the BS 434 over a mmW link 438.

In FIG. 4C, diagram 470 illustrates a deployment where a BS capable of communicating signals via the LTE system and the mmW system (LTE+mmW base station) is present with BSs capable of communicating signals via the mmW system only. As shown in FIG. 4C, a UE 472 may communicate with a LTE+mmW BS 474 over a LTE link 480. The LTE+mmW BS 474 may be a LTE+mmW eNB. In parallel with the LTE link 480, the UE 472 may also communicate with a second BS 476 over a first mmW link 482 and communicate with a third BS 478 over a second mmW link 484. The second BS 476 may further communicate with the LTE+mmW BS 474 over a first mmW backhaul link 484. The third BS 478 may further communicate with the LTE+mmW BS 474 over a second mmW backhaul link 486.

Figure 5A:
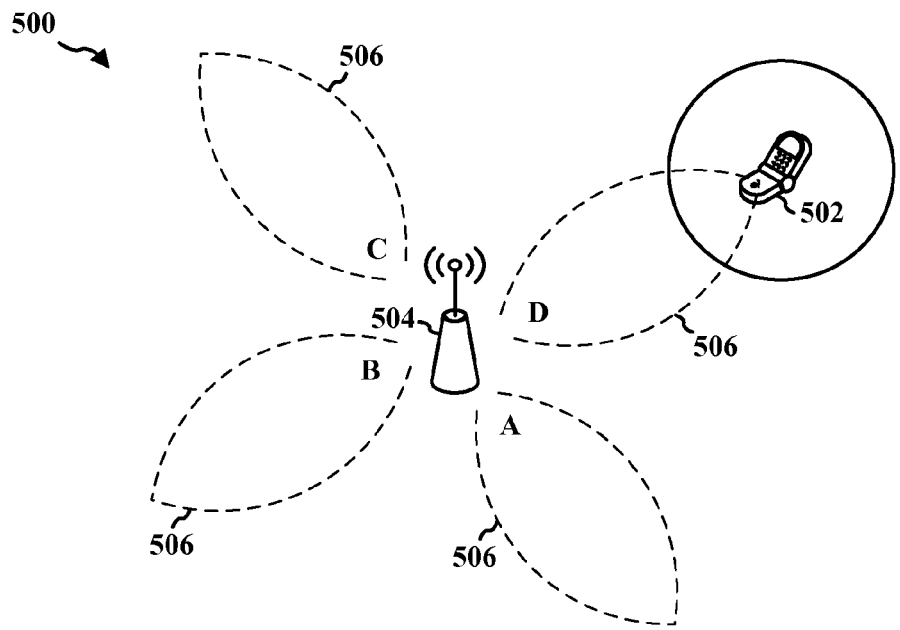
FIGS. 5A and 5B are diagrams illustrating an example of the transmission of beamformed signals between a connection point and a UE.
Figure 5B:
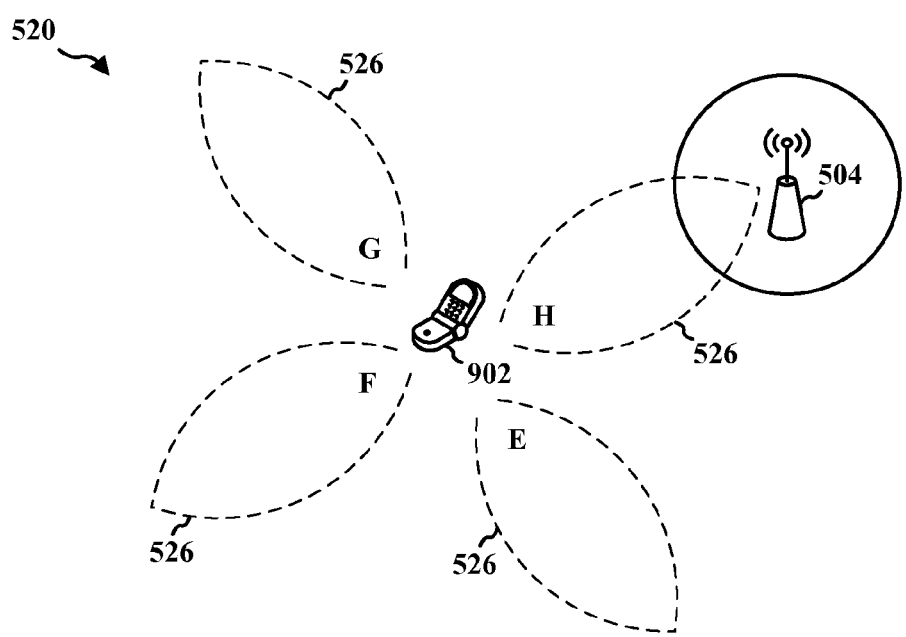

FIGS. 5A and 5B are diagrams illustrating an example of the transmission of beamformed signals between a CP and a UE. The CP may be embodied as a BS in a mmW system (mmW BS). Referring to FIG. 5A, diagram 500 illustrates a CP 504 of a mmW system transmitting beamformed signals 506 (e.g., synchronization signals or discovery signals) in different transmit directions (e.g., directions A, B, C, and D). In an example, the CP 504 may sweep through the transmit directions according to a sequence A-B-C-D. In another example, the CP 504 may sweep through the transmit directions according to the sequence B-D-A-C. Although only four transmit directions and two transmit sequences are described with respect to FIG. 5A, any number of different transmit directions and transmit sequences are contemplated.

After transmitting the signals, the CP 504 may switch to a receive mode. In the receive mode, the CP 504 may sweep through different receive directions in a sequence or pattern corresponding (mapping) to a sequence or pattern in which the CP 504 previously transmitted the synchronization/discovery signals in the different transmit directions. For example, if the CP 504 previously transmitted the synchronization/discovery signals in transmit directions according to the sequence A-B-C-D, then the CP 504 may sweep through receive directions according to the sequence A-B-C-D in an attempt to receive an association signal from a UE 502. In another example, if the CP 504 previously transmitted the synchronization/discovery signals in transmit directions according to the sequence B-D-A-C, then the CP 504 may sweep through receive directions according to the sequence B-D-A-C in an attempt to receive the association signal from the UE 502.

A propagation delay on each beamformed signal allows a UE 502 to perform a receive (RX) sweep. The UE 502 in a receive mode may sweep through different receive directions in an attempt to detect a synchronization/discovery signal 506 (see FIG. 5B). One or more of the synchronization/discovery signals 506 may be detected by the UE 502. When a strong synchronization/discovery signal 506 is detected, the UE 502 may determine an optimal transmit direction of the CP 504 and an optimal receive direction of the UE 502 corresponding to the strong synchronization/discovery signal. For example, the UE 502 may determine preliminary antenna weights/ directions of the strong synchronization/discovery signal 506, and may further determine a resource (e.g., as discussed infra with respect to FIG. 7) where the CP 504 is expected to optimally receive a beamformed signal. Thereafter, the UE 502 may attempt to associate with the CP 504 via a beamformed signal.

Referring to diagram 520 of FIG. 5B, the UE 502 may listen for beamformed discovery signals in different receive directions (e.g., directions E, F, G, and H). In an example, the UE 502 may sweep through the receive directions according to a sequence E-F-G-H. In another example, the UE 502 may sweep through the receive directions according to the sequence F-H-E-J. Although only four receive directions and two receive sequences are described with respect to FIG. 5B, any number of different receive directions and receive sequences are contemplated.

The UE 502 may attempt the association by transmitting beamformed signals 526 (e.g., association signals) in the different transmit directions (e.g., directions E, F, G, and H). In an aspect, the UE 502 may transmit an association signal 526 by transmitting along the optimal receive direction of the UE 502 at the time/resource where the CP 504 is expected to optimally receive the association signal. The CP 504 in the receive mode may sweep through different receive directions and detect the association signal 526 from the UE 502 during one or more timeslots corresponding to a receive direction. When a strong association signal 526 is detected, the CP 504 may determine an optimal transmit direction of the UE 502 and an optimal receive direction of the CP 504 corresponding to the strong association signal. For example, the CP 504 may determine preliminary antenna weights/directions of the strong association signal 526, and may further determine a time and/or resource where the UE 502 is expected to optimally receive a beamformed signal. Any of the processes discussed above with respect to FIGS. 5A and 5B may be refined or repeated over time such that the UE 502 and CP 504 eventually learn the most optimal transmit and receive directions for establishing a link with each other. Such refinement and repetition may be referred to as beam training In an aspect, the CP 504 may choose a sequence or pattern for transmitting the synchronization/discovery signals according to a number of beamforming directions. The CP 504 may then transmit the signals for an amount of time long enough for the UE 502 to sweep through a number of beamforming directions in an attempt to detect a synchronization/discovery signal. For example, a CP beamforming direction may be denoted by n, where n is an integer from 0 to N, N being a maximum number of transmit directions. Moreover, a UE beamforming direction may be denoted by k, where k is an integer from 0 to K, K being a maximum number of receive directions. When the UE 502 detects a synchronization/discovery signal from the CP 504, the UE 502 may discover that the strongest synchronization/discovery signal is received when the UE 502 beamforming direction is k=2 and the CP 504 beamforming direction is n=3. Accordingly, the UE 502 may use the same antenna weights/directions for responding (transmitting a beamformed signal) to the CP 504 in a corresponding response timeslot. That is, the UE 502 may send a signal to the CP 504 using UE 502 beamforming direction k=2 during a timeslot when the CP 504 is expected to perform a receive sweep at CP 504 beamforming direction n=3.

The present disclosure provides a method and apparatus for integrating make-before-break mobility with link-specific beam training. In an aspect, a UE may conduct a beam training sequence and/or beam refinement sequence independently with a serving base station and with each potential target base station. The sequences may establish a separate beam pair for each UE-to-base station link. An air-interface resource (e.g., an away-resource) may be allocated to the UE for beam training efforts and data exchange with potential target base stations. A link strength metric may be derived from the beam training/beam refinement sequence and used to determine if the UE should store/cache state information (signaling information) on behalf of a corresponding target base station. The UE may store/cache information related to a target base station and an associated beam in order to communicate with the target base station. In an aspect, the UE may exchange data with two base stations, wherein some data may be exchanged with a first base station using the away-resource and other data may be exchanged with a second base station using other time/frequency resources.

Figure 6:
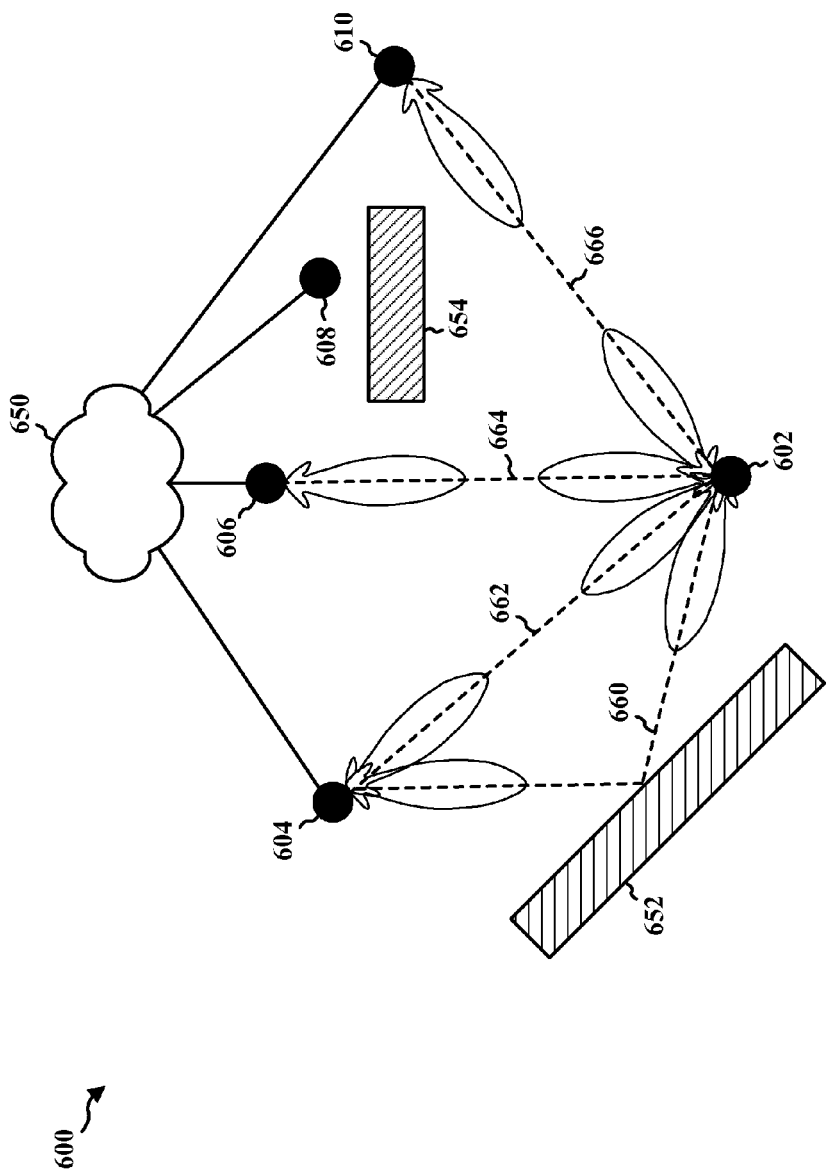
FIG. 6 is a diagram illustrating an architecture of a mmW access network with path-specific beamforming.

FIG. 6 is a diagram 600 illustrating an architecture of a mmW access network with path-specific beamforming. Referring to FIG. 6, four base stations (BS1 604, BS2 606, BS3 608, and BS4 610) are connected to a network 650. A mobile device (e.g., UE) 602 may sustain an active link with BS4 610. The mobile device 602 and BS4 610 may conduct a beam training/beam refinement sequence to create an appropriate beam pair that is aligned with a path of the link (path 666). While traffic data is exchanged on the active link, the mobile device 602 may conduct beam training/beam refinement sequences with the BS1 604 to create an appropriate beam pair that is aligned with a path 660 and/or path 662. In FIG. 6, a first obstruction 652 may be capable of reflecting beams. Therefore, beams traveling between the mobile device 602 and the BS1 604 along the path 660 may reflect off the first obstruction 652 in order to reach their intended destination. The mobile device 602 may also conduct beam training/beam refinement sequences with the BS2 606 to create an appropriate beam pair that is aligned with a path 664. The mobile device 602 may store/cache information related to the created beam pairs with respect to each BS. A second obstruction 654 may block a line-of-sight between the mobile device 602 and the BS3 608. Accordingly, the mobile device 602 may not be able to conduct beam training/beam refinement sequences with the BS3 608.

In an aspect, the present disclosure applies to a wireless access network comprising a plurality of base stations. A mobile device can access the network and exchange traffic data via one or more of the base stations using a wireless air interface. The air interface operates in a frequency range, where a link between the mobile device and the base station may demand that each end point create a dedicated antenna beam that points along an interconnecting propagation path. This may apply to frequency ranges above 5 to 6 GHz (i.e., above the frequency bands used for present cellular systems). This may also apply to frequency ranges having a wavelength larger than or equal to 10 mm (millimeter-wave range) where the creation of very narrow antenna beams is desired for overcoming propagation loss.

A beam training sequence may be performed between a mobile device and base station to establish a beam pair for a mobile device-base station link. To sustain the link in the presence of channel dynamics and user mobility, the mobile device and base station may perform a periodic beam refinement sequence and/or eventually perform a new beam training sequence. The beam training and beam refinement sequences may involve an exchange of information between both end points (mobile device and base station). The information exchange results in one of the two end points acquiring state information (signaling information) from the other of the two end points. The state information may include information about a remote end point of the link and a type of beam for communicating on the link. An example of the signaling associated with beam training and beam refinement sequences may be found in the IEEE 802.11ad standard specification.

While the mobile device and base station may use beam training and/or beam refinement sequences to create and sustain a link, mobility and channel dynamics may force the mobile device to handover to another base station. While handover between base stations is commonly known from cellular technologies, the need for beam training and/or beam refinement adds unique obstacles. In particular, how to find other base stations as candidates for handover may not be clear to the mobile device while using its radio to exchange traffic data with a serving base station. Further, radio links at high frequency bands may be vulnerable to shadowing effects and can rapidly fail. To quickly respond to rapid radio link failure, handover preparation, i.e., identification of an alternative base station for the mobile device, must occur early and the handover must be executed swiftly. Otherwise, handover creates noticeable interruptions to applications using the wireless link. However, the requirement for fast handover conflicts with the need for beam training and/or beam refinement sequences, which may demand a considerable amount of time for signaling exchanges on each link.

While speeding up handover may be desirable, speedy handover may cause frequent handovers between two base stations (e.g., ping-ponging) at a cell edge. This may cause high signaling overhead and impair higher-layer performance. It is therefore desirable to conduct handover in a make-before-break manner, e.g., allow traffic to be routed via two or multiple independent base stations for some amount of time prior to completing the handover to one of the base stations. This may require beam training and/or beam refinement to be simultaneously conducted with at least two base stations.

In an aspect, a mobile device (e.g., UE) may sustain a link with a serving base station and to use the link to exchange traffic data with a network and conduct periodic beam refinement and/or beam training with the serving base station. A link strength metric may be derived from beam training and/or beam refinement sequences performed with the serving base station.

Periodically, an air-interface resource (hereinafter referred to as an "away-resource") may be allocated to the mobile device. The mobile device may use the away-resource to suspend traffic exchange with the serving base station and to perform base station candidate management. The away-resource may be a timeslot, for example. Base station candidate management may include searching for other base stations that may be candidates for handover, reasserting existing base station candidacies, and/or initiating handover to a base station candidate. A base station may be referred to as a base station candidate when the mobile device possesses state information (signaling information) related to the base station and information related to at least one beam for communicating with the base station. The state information related to the base station candidate may include a base station identifier (ID) or cell ID and other base station information, such as timing information. The state information may also include link specific information, such as a session key, for example. The away-resource may also be used by the mobile device for exchanging traffic data with a candidate base station. In this manner, the mobile device may use the same radio for data and signaling exchange with the serving base station, base station candidate management, and data and signaling exchange with base station candidates.

The search for new base station candidates involves conducting at least one beam training sequence between the mobile device and any other base station that is not currently a candidate or a serving base station. The mobile device uses the allocated away-resource to conduct an associated signaling exchange. From the signaling exchange, a link strength metric may be derived, whose value determines if the base station becomes a candidate. In this case, the mobile device may exchange all state information (signaling information) associated with candidacy. For example, the mobile device may transmit its own state information to the BS. The mobile device may also receive BS state information from the BS. Additional signaling necessary for exchanging state information may also be conducted using the away-resource. The link strength metric may be derived by the mobile device or the base station independently, or may be derived in unison via measurements conducted at both the mobile device and the base station. The decision of whether to designate the base station as a candidate may be made by the mobile device, the network, or both. Any information exchanged for the purpose of deciding whether to designate the base station a candidate may be considered part of the beam training sequence.

The reassertion of base station candidacy involves conducting at least one beam-refinement sequence or beam training sequence between the mobile device and the candidate base station. The mobile device uses the away-resource to conduct an associated signaling exchange. From the signaling exchange, a link strength metric may be derived, whose value determines if the base station remains a candidate. If the base station is determined to no longer be a candidate, the mobile device may remove all state information (signaling information) related to the base station. Otherwise, the mobile device may update the state information related to the base station, which may include a more accurate beam for the link to the base station, for example.

Periodically, handover conditions are evaluated using link strength values obtained for base station candidates and/or the serving base station. A decision process may be based on comparing the various link strength values with each other, or with a threshold value in an analog manner. The decision to proceed with the handover may be made by the mobile device or the network. All signaling necessary to conduct handover may be exchanged between the mobile device and the serving base station. The signaling may also be exchanged between the mobile device and the base station candidate selected for handover using the away-resource.

Referring to FIG. 6, in an example, when handover from a serving base station BS4 610 to a base station candidate BS2 606 is conducted, the base station candidate BS2 606 becomes the new serving base station. A link to the new serving base station BS2 606 becomes the new active link used by the mobile device 602 for exchanging traffic data. The new active link is also used by the mobile device 602 for periodic beam training and/or beam refinement sequences with the base station BS2 606. A new away-resource may be allocated to the mobile device 602 for performing candidate management with other base stations (e.g., BS1 604).

The away-resource may also be used by the mobile device for exchanging data with a base station candidate. This enables make-before-break handover, where in-flight data is delivered on a link with a serving base station while new arriving data is forwarded via the base station candidate. Multipath multiplexing is also enabled, where a data exchange between the mobile device and the network may be split between the link to the serving base station and the link to the base station candidate. For these cases, the mobile device may create a beam that is stored/cached for the serving base station when exchanging data with the serving base station not using the away-resource. The mobile device may also create a beam that is stored/cached for the base station candidate when exchanging data with the base station candidate using the away-resource. The mobile device may combine data received on two different links onto one data stream. In the same manner, the mobile device may maintain a scheduler to split an outgoing data stream between two different links.

Figure 7:
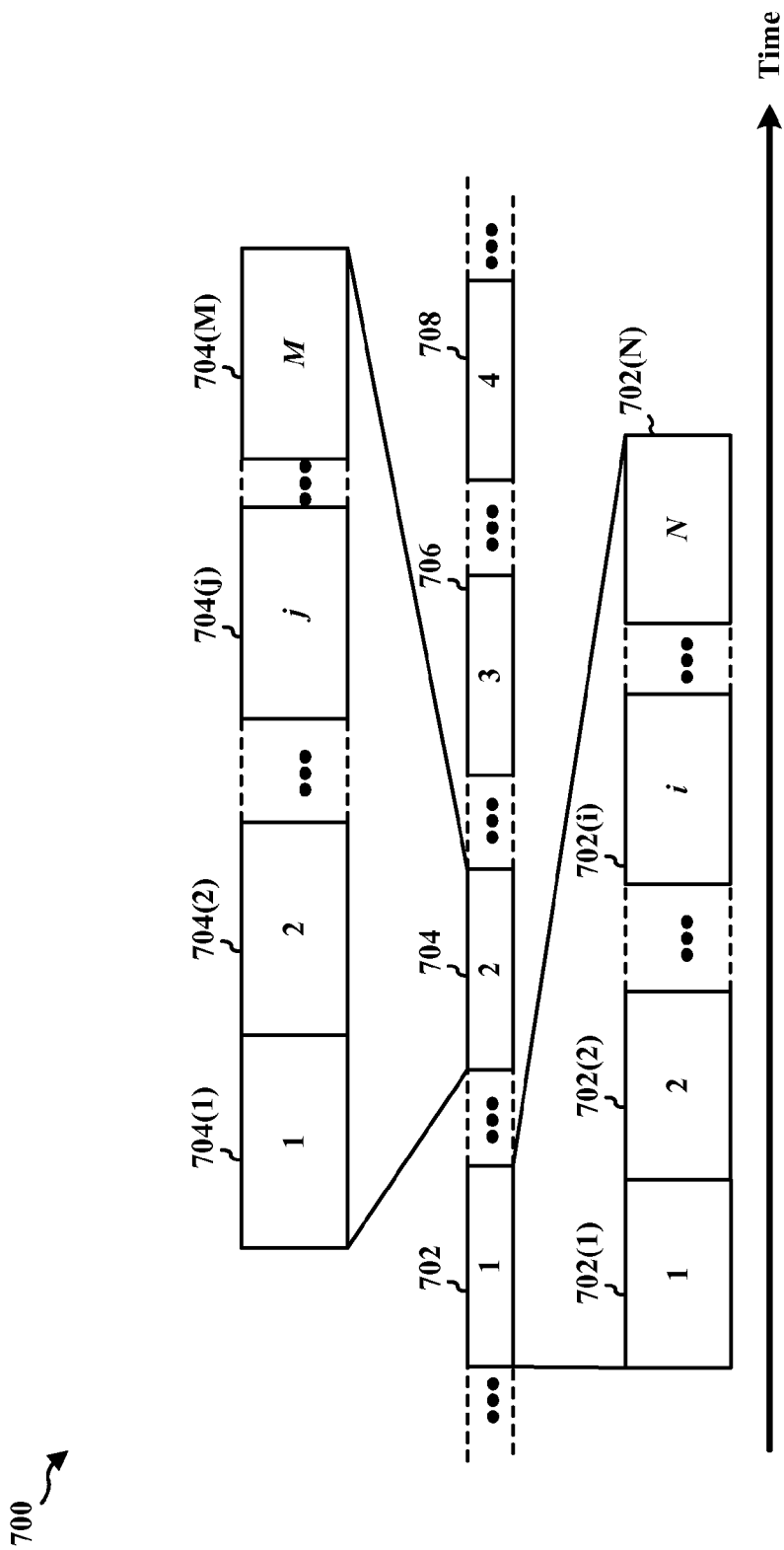
FIG. 7 is a diagram illustrating an away-resource structure.

FIG. 7 is a diagram 700 illustrating an away-resource structure. The away-resource may include one or more timeslots, e.g., timeslot-1 702, timeslot-2 704, timeslot-3 706, and timeslot-4 708. Each of the timeslots may include a number of sub-timeslots. For example, the timeslot-1 702 may include N sub-timeslots (e.g., sub-timeslot-1 702(1), sub-timeslot-2 702(2), . . . , sub-timeslot-i 702($i$), . . . , and sub-timeslot-N 702(N). In another example, the timeslot-2 704 may include M sub-timeslots (e.g., sub-timeslot-1 704(1), sub-timeslot-2 704(2), . . . , sub-timeslot-j 704($j$), . . . , and sub-timeslot-M 702(M). The timeslots may be allocated within a frame, subframe, or superframe structure as supported, for example, by LTE. The away-resource may also be defined as a separate frequency band or a subset of subcarriers or tones in an OFDMA system. In an aspect, specific code-spreading sequences may be assigned as an away-resource. Away-resources may be configured network-wide, cell-wide, or on a per-mobile device/per-base station level. The away-resource may be subdivided, e.g., divided into an uplink and downlink section. Alternatively, independent away-resources may be allocated for uplink and downlink. The away-resource may be used for signaling and data exchange between the mobile device and base stations other than the serving base station. The away-resource may be shared among multiple base stations or multiple mobile devices in a preconfigured, scheduled, or contention-based manner.

Figure 8:
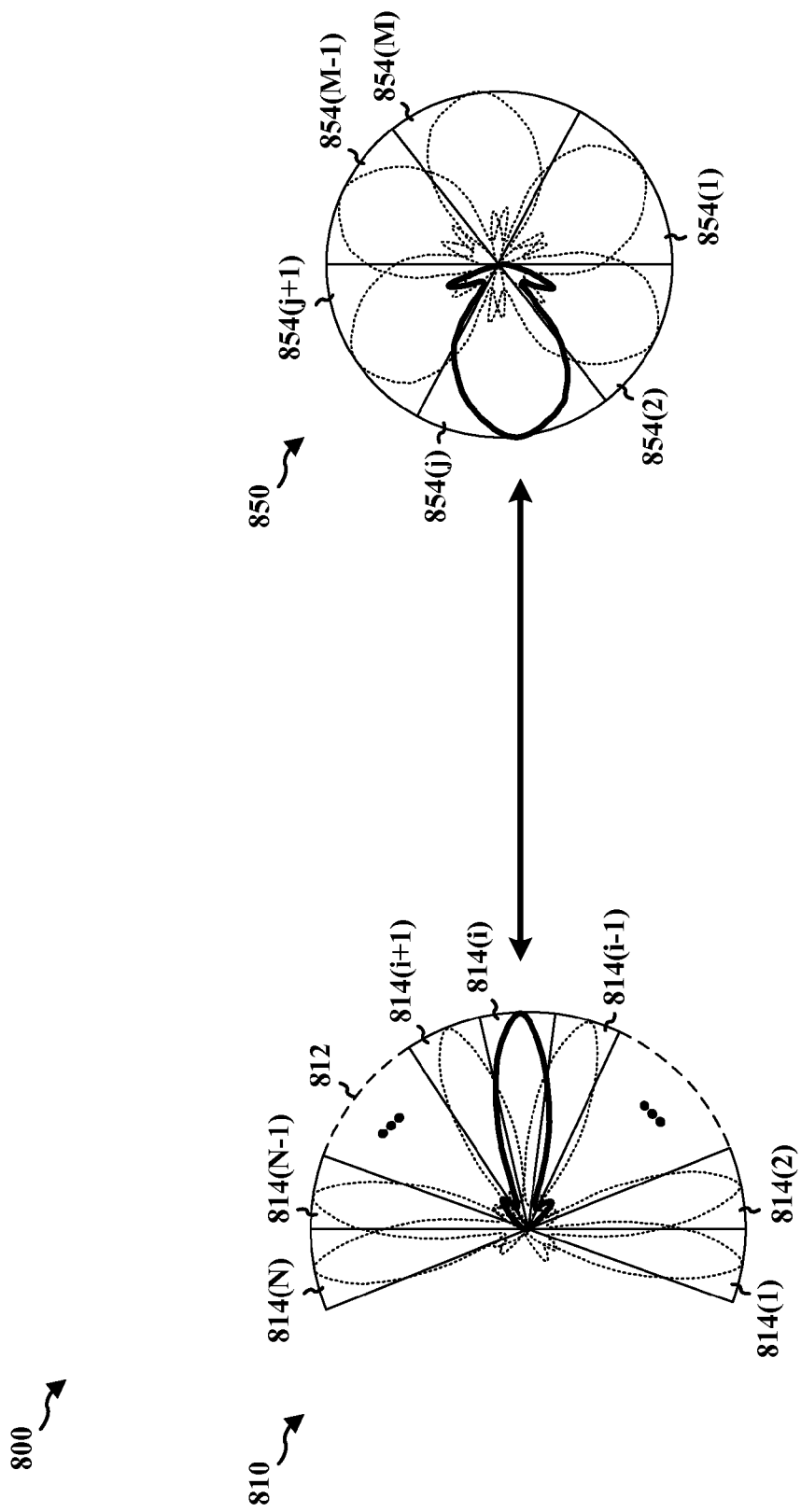
FIG. 8 is a diagram illustrating a base station beam sweep and a mobile station beam sweep.

FIG. 8 is a diagram 800 illustrating a base station beam sweep 810 and a mobile station beam sweep 850. Referring to the base station beam sweep 810, an angular range of the base station is denoted by reference 812. The base station may transmit a number of beams corresponding to a number of sectors within the angular range. For example, the base station may transmit a beam along a first sector 814(1), a second sector 814(2), . . . , an (i−1)-th sector 814($i$−1), an i-th sector 814($i$), an (i+1)-th sector 814($i$+1), . . . , an (N−1)-th sector 814(N−1), and an N-th sector 814(N). Referring to the mobile station beam sweep 850, the mobile station may transmit a number of beams corresponding to a number of sectors within an angular range of the mobile station. For example, the mobile station may transmit a beam along a first sector 854(1), a second sector 854(2), a j-th sector 854($j$), a (j+1)-th sector 854($j$+1), an (M−1)-th sector 854 (M−1), and an M-th sector 854(M). In the example shown in FIG. 8, j may equal 3 and M may equal 6.

Figure 9:
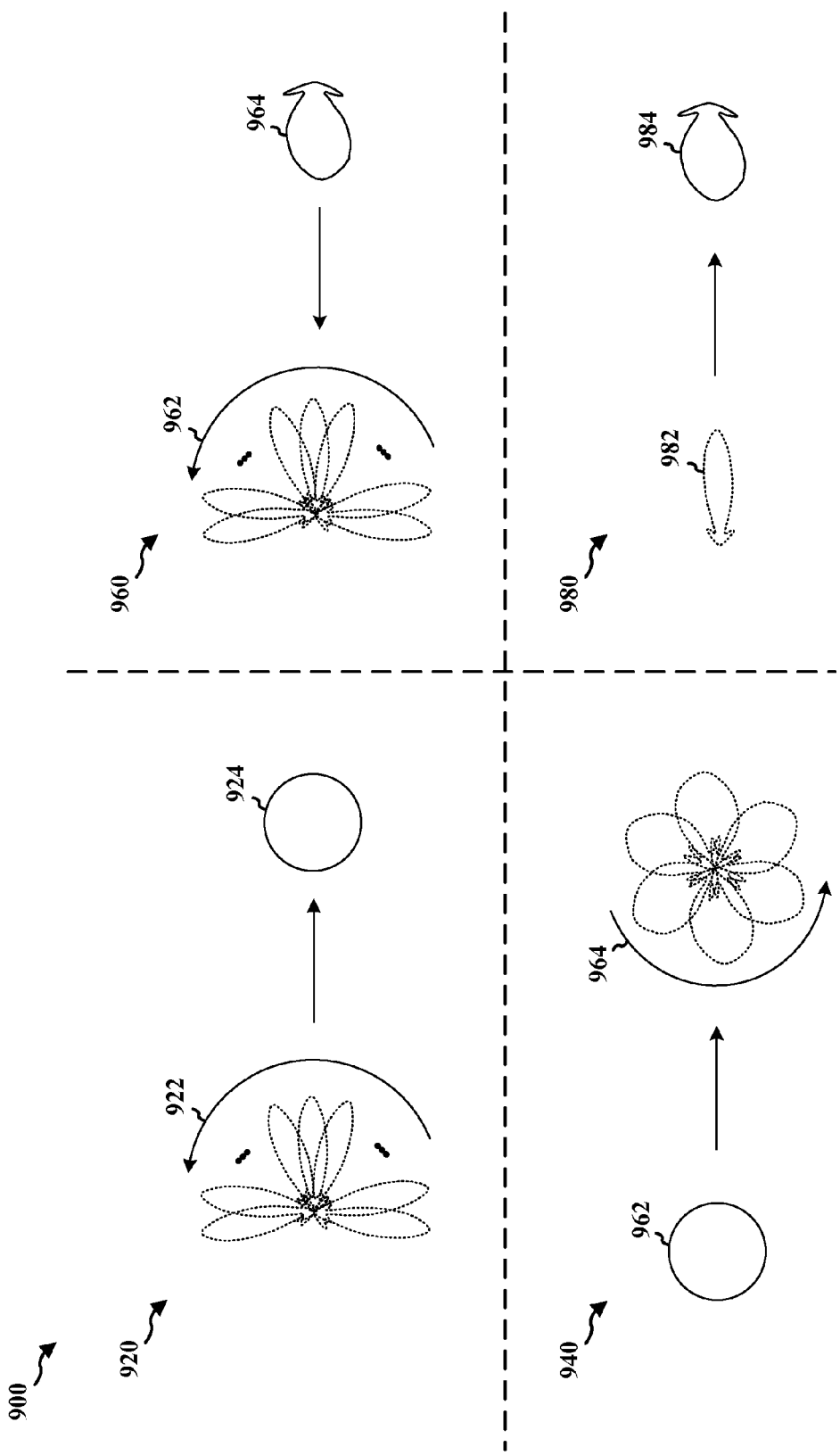
FIG. 9 is a diagram illustrating a beam training sequence across different timeslots.

FIG. 9 is a diagram 900 illustrating a beam training sequence across different timeslots. In an aspect, all base stations in the network may be time-synchronized and sustain a network-wide frame structure in the time domain. Accordingly, a fixed portion of time resources, such as a fraction of a frame, may be allocated as a network-wide away-resource. The resource can be subdivided into timeslots, where a first timeslot may support a base station beam sweep, a second timeslot may support a mobile station beam sweep, a third time slot may support access requests by the mobile station to the base station, and a fourth time slot may support the base station responding to the mobile station's requests.

A beam training sequence between a mobile station (MS) (e.g., UE) and a base station (BS) may be described with respect to FIGS. 7-9. In an aspect, the BS and MS are sufficiently time-synchronized and a channel between them is reciprocal, such as in Time Division Duplex (TDD) systems. Time synchronization enables the MS and BS to have time-aligned frames and timeslots. Moreover, the occurrence of timeslots 1 to 4 within a framing structure may be predefined or shared between the BS and MS in some manner.

Referring to FIG. 9, the BS may subdivide a horizontal angular coverage range into N sectors (FIG. 8) and subdivide the first time slot 920 (timeslot 1) into the same amount of sub-timeslots (FIG. 7). For the BS transmit beacon sweep 922, the BS may step through the sectors in a predefined sequence transmitting a beacon on a narrow beam in each sector. Each beacon may contain signaling information such as a BS identifier (BS ID). During the BS's transmit beacon sweep 922, the MS activates a receiver with an open beam 924 so that the MS can receive BS beacons from all potential directions. Upon reception of a BS beacon signal, the MS decodes and stores/caches the BS ID as well as the sub-timeslot in which the beacon signal was received with the strongest signal strength (e.g., i-th sub-time-slot in FIG. 7 and i-th sector in FIG. 8).

Still referring to FIG. 9, in the second timeslot 940 (timeslot 2), the BS may transmit a beacon with an open antenna beam 962 while the MS performs a receive beam sweep 964 on its receiver over M sectors using M sub-timeslots. This allows the MS to determine the best MS beam to communicate with the BS (e.g., j-th sub-timeslot in FIG. 7 and j-th sector in FIG. 8). N, the number of BS sectors, may be different from M, the number of MS sectors.

In the third timeslot 960 (timeslot 3), the BS may perform a receive beam sweep 962 with its receiver using the same sectors and the same sequence as in the first timeslot 920 (timeslot 1). The MS, having previously determined the best sub-timeslot to reach the BS, may transmit an access signal in the sub-timeslot with the best MS transmit beam 964 for the BS (e.g., j-th beam in FIG. 8). The MS may insert and MS identifier (MS ID) in the access signal. The BS, receiving the access signal, may derive the MS ID as well as a corresponding BS beam to communicate with the MS.

In the fourth time slot 980 (timeslot 4), after sending the access signal, the MS will expect a response from the BS and therefore forms a corresponding MS receive beam 984 for receiving the BS response. The BS may transmit the response to the access signal using an appropriate BS transmit beam 982 (e.g., i-th beam in FIG. 8). Via the exchange of access and response signals (handshake), the MS and BS have mutually discovered a best beam pair to communicate with each other. Further time slots may be allocated to exchange additional information.

In an aspect, the MS may request an away-resource from a serving BS. The serving BS may coordinate with neighbor BSs via a backhaul to allocate the away-resource and forward the outcome to the MS.

In another aspect, the MS may self-allocate the away-resource via a Listen-Before-Talk procedure (LBT). Here, the MS may listen and wait until a channel is clear, and then broadcast a beacon signal beam sweep to neighbor BSs. Since the serving BS may also conduct a LBT procedure, the serving BS will not forward data to the MS when observing that the MS is in a broadcast mode. The serving BS may further provide sufficient time for neighbor BSs to respond to the MS sweep (e.g., via the neighbor BSs' own sweep) before the serving BS starts further data transmissions. Similarly, the serving BS may initiate a transmit beam sweep after a clear channel assessment. MSs served by such BS may hold data transmissions until after the BS's transmit sweep is completed so that neighbor-cell MSs may conduct their own sweep or a random access attempt to the BS. The procedures discussed above are compliant with carrier sense multiple access (CSMA)-type air-interface protocols.

The beam training sequence is based on the assumption that each MS and BS can switch between multiple antenna beams. Each beam may be created via a multitude of antenna elements by selecting an appropriate amplitude and phase vector. Alternatively, beams may be switched by switching between individual antennas or using a switching matrix connected to multiple antennas, such as a Butler matrix. The beam refinement sequence may switch between a subset of available beams, for example, or switch beams with a finer step size. A best beam produced by a beam training or beam refinement sequence may be represented in a concise form, e.g., via a beam identifier (ID) or a vector representing amplitudes and phase settings of an antenna array.

In an aspect, the beam training and beam refinement sequence may be implemented according to protocols described in IEEE 802.11ad technical specifications. In a further aspect, a link strength metric may be based on a signal strength measurement, a signal-to-noise ratio (SNR) measurement, a signal-to-interference-plus-noise ratio (SINR) measurement, a data rate estimate, or the like. In another aspect, state information (signaling information) for base station candidates may include a cell ID, a timing offset, a session key, cell configuration settings, a dedicated preamble for access, or information regarding away-resources to access a base station candidate.

In an aspect, a beam training sequence may produce multiple beam pairs where each beam pair aligns with a propagation path between a MS and BS. The MS may cache all or a subset of state information associated with the beam pairs. The MS may cache the state information of beam pairs that correspond to links that the MS sustains with a serving BS and beam pairs that correspond to links that the MS sustains with any candidate BS. Beam-per-link management may be performed, for example, during signaling periods that are used for beam training sequences. The beam-per-link management may allow end nodes (MS and BS) to select one of the paths, switch between the paths, or apply a mechanism to utilize multiple paths for data multiplexing.

In an aspect, although many of the above-mentioned procedures are described with respect to the mobile device/MS, the procedures may equivalently be applied to the BS. As such, an away-resource may be allocated to the BS, which the BS uses to communicate with potential MS candidates that are served by neighbor BSs. Beam training and beam refinement sequences may be applied by the BS in the same manner as the MS. Also, the BS may create state information for MS candidates similar to the way an MS creates state information for BS candidates. Link metric-based decisions applied by the BS for deciding whether to designate a MS as a candidate, discontinue candidacy of a MS, and/or initiate handover may be similar to the link metric-based decisions applied by the MS. In an aspect, there may be a one-to-one correspondence between a MS candidate and a BS candidate. As such, a BS that is a candidate of a MS should also designate the MS as a candidate (and vice versa).

Figure 10:
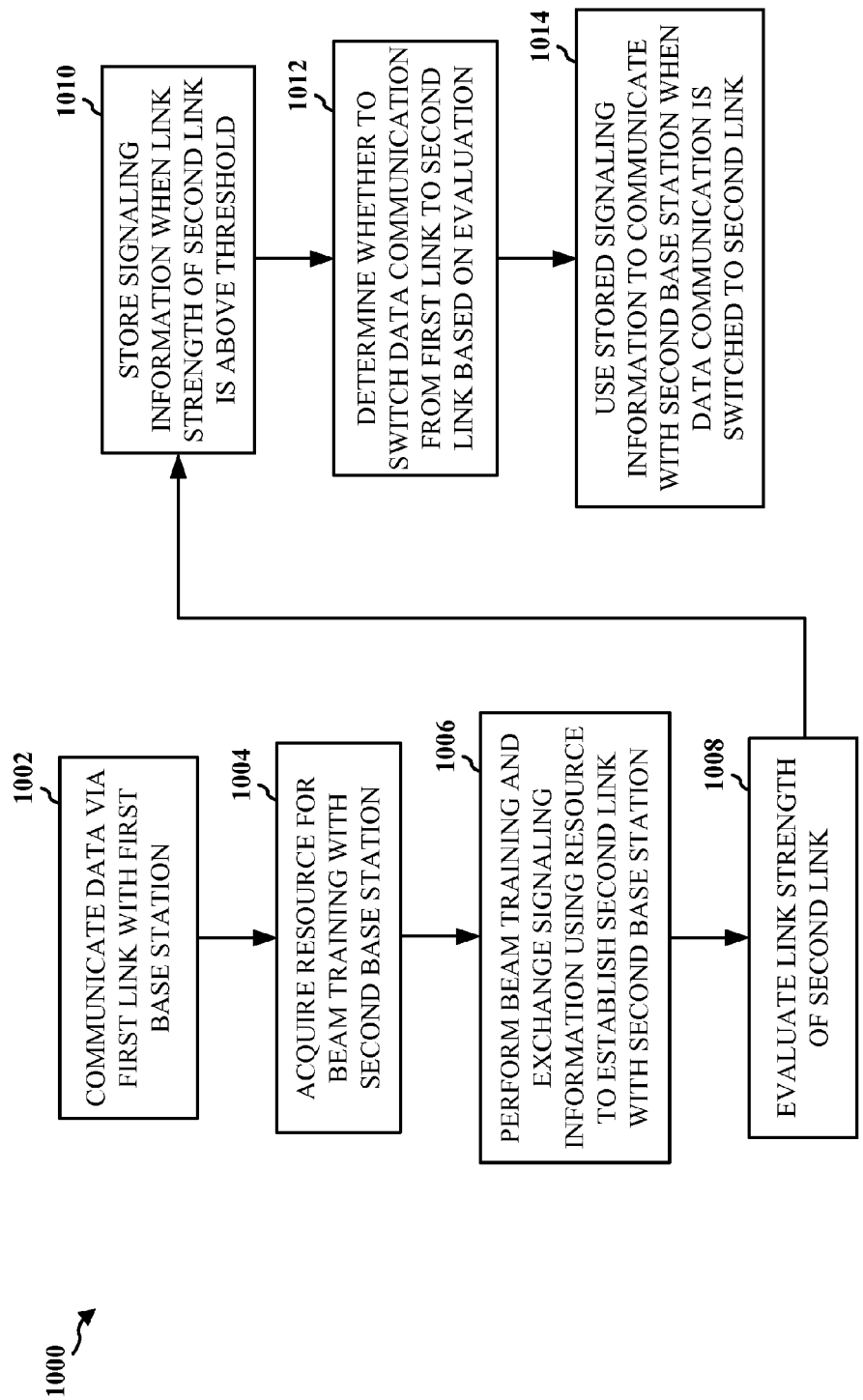
FIG. 10 is a flow chart of a method for sustaining a link with a wireless network.

FIG. 10 is a flow chart 1000 of a method for sustaining a link with a wireless network. The method may be performed by a UE (e.g., mobile device in FIG. 6 or mobile station in FIGS. 8 and 9). At block 1002, the UE communicates data with the wireless network via a first link with a first base station.

At block 1004, the UE acquires a resource to perform a beam training sequence with a second base station. The acquired resource allows the beam training sequence with the second base station to be performed while the data is communicated via the first link. In an aspect, the resource is at least one of a timeslot or a frequency band. The resource may be acquired via a resource allocation from at least one of the first base station or the second base station. Alternatively, the resource may be independently acquired by the UE.

At block 1006, the UE performs the beam training sequence and exchanges signaling information with the second base station using the resource to establish a second link to the second base station. The signaling information may include, for example, a base station ID, a cell ID, timing information, link specific information (e.g., session key), and/or a type of beam for communicating on the second link. In an aspect, the data is communicated with the first base station via the first link while second data is communicated with the second base station via the second link. The data received via the first link and the second data received via the second link may be combined into a single data stream. Additionally or alternatively, the data transmitted via the first link and the second data transmitted via the second link may be generated from a single data stream.

At block 1008, the UE evaluates a link strength of the second link based on the beam training sequence. At block 1010, the UE may store/cache the signaling information exchanged with the second base station when the link strength of the second link is above a threshold.

At block 1012, the UE determines whether to switch the data communication from the first link to the second link based on the evaluation. In an aspect, the UE may determine whether to switch by first performing a beam refinement sequence and exchanging signaling information with the first base station using another resource. The beam training sequence and the beam refinement sequence may be performed via a single radio. The UE then evaluates a link strength of the first link based on the beam refinement sequence and compares at least one of the link strength of the first link or the link strength of the second link to a threshold. The data communication may be switched from the first link to the second link when the link strength of the first link is less than the threshold, or the link strength of the second link is greater than the threshold.

In another aspect, the UE may determine whether to switch by first reporting to the wireless network via the first base station or the second base station at least one of the link strength of the first link, the link strength of the second link, or the comparison to the threshold. Thereafter, the UE may receive, in response to the report, a switching message from the wireless network via the first base station or the second base station. Accordingly, the UE may switch the data communication from the first link to the second link based on the received switching message.

At block 1014, the UE may use the stored signaling information to communicate with the second base station when the data communication is switched to the second link.

Figure 11:
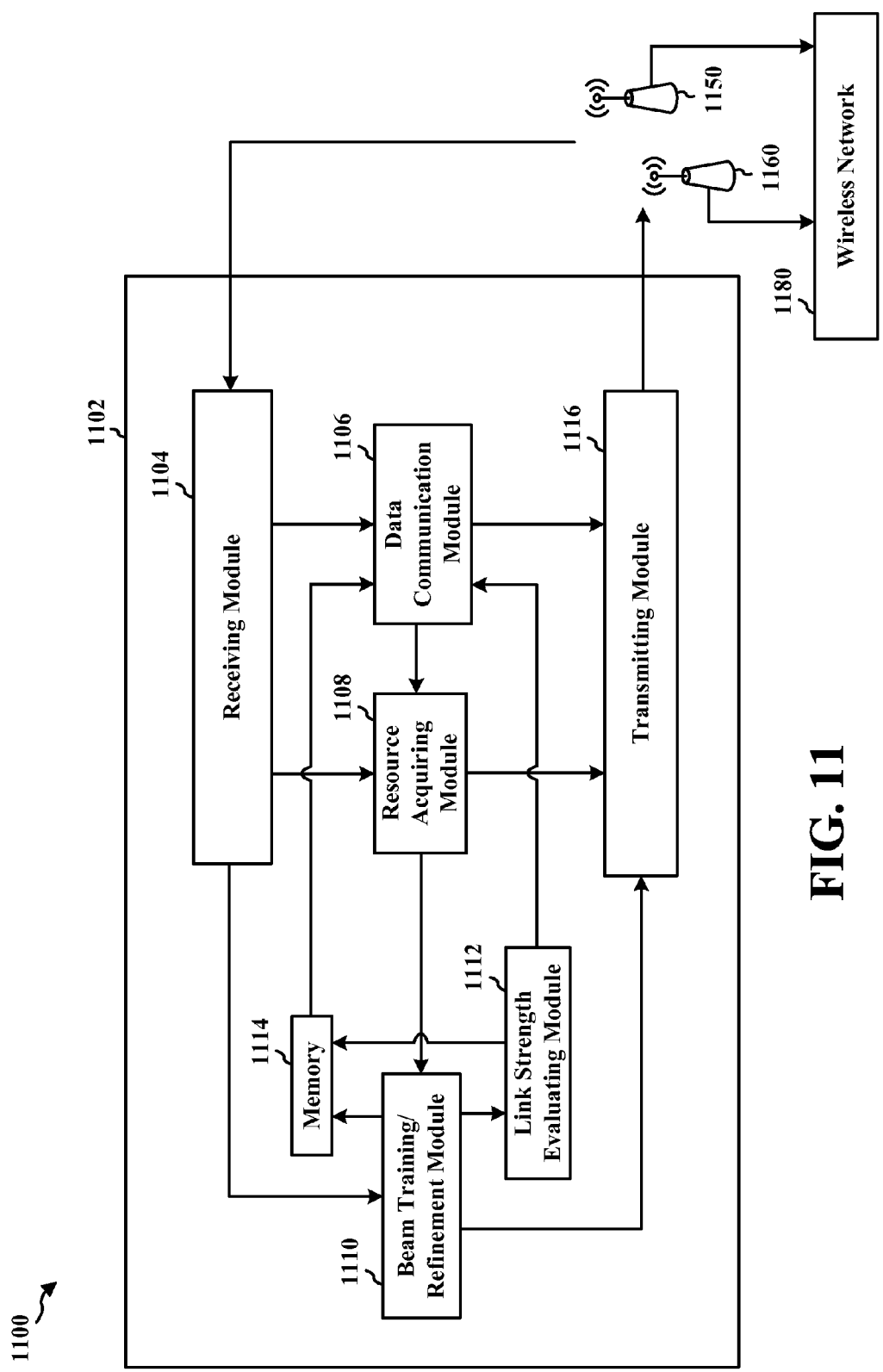
FIG. 11 is a data flow diagram illustrating the data flow between different modules/means/components in an exemplary apparatus.

FIG. 11 is a data flow diagram 1100 illustrating the data flow between different modules/means/components in an exemplary apparatus 1102. The apparatus may be a UE (e.g., mobile device in FIG. 6 or mobile station in FIGS. 8 and 9) for sustaining a link with a wireless network 1180. The apparatus includes a receiving module 1104, a data communication module 1106, a resource acquiring module 1108, a beam training/refinement module 1110, a link strength evaluating module 1112, a memory 1114, and a transmitting module 1116.

The data communication module 1106 communicates data with the wireless network 1180 via a first link with a first base station 1150. The resource acquiring module 1108 acquires a resource to perform a beam training sequence with a second base station 1160. The acquired resource allows the beam training sequence with the second base station 1160 to be performed while the data is communicated via the first link. In an aspect, the resource is at least one of a timeslot or a frequency band. The resource may be acquired via a resource allocation from at least one of the first base station 1150 or the second base station 1160. Alternatively, the resource may be independently acquired by the resource acquiring module 1108.

The beam training/refinement module 1110 performs the beam training sequence and exchanges signaling information with the second base station 1160 (via the receiving module 1104 and the transmitting module 1116) using the resource to establish a second link to the second base station 1160. The signaling information may include, for example, a base station ID, a cell ID, timing information, link specific information (e.g., session key), and/or a type of beam for communicating on the second link. In an aspect, the data is communicated with the first base station 1150 via the first link while second data is communicated with the second base station 1160 via the second link. The data received via the first link and the second data received via the second link may be combined into a single data stream. Additionally or alternatively, the data transmitted via the first link and the second data transmitted via the second link may be generated from a single data stream.

The link strength evaluating module 1112 evaluates a link strength of the second link based on the beam training sequence. The memory may store/cache the signaling information exchanged with the second base station 1160 when the link strength of the second link is above a threshold.

The data communication module 1106 determines whether to switch the data communication from the first link to the second link based on the evaluation. In an aspect, the data communication module 1106 may determine whether to switch by facilitating the beam training/refinement module 1110 to first perform a beam refinement sequence and exchange signaling information with the first base station 1150 (via the receiving module 1104 and the transmitting module 1116) using another resource. The beam training sequence and the beam refinement sequence may be performed via a single radio. The link strength evaluating module 1112 then evaluates a link strength of the first link based on the beam refinement sequence and compares at least one of the link strength of the first link or the link strength of the second link to a threshold. The data communication module 1106 may switch the data communication from the first link to the second link when the link strength of the first link is less than the threshold, or the link strength of the second link is greater than the threshold.

In another aspect, the data communication module 1106 may determine whether to switch by first reporting (using the transmitting module 1116) to the wireless network 1180 via the first base station 1150 or the second base station 1160 at least one of the link strength of the first link, the link strength of the second link, or the comparison to the threshold. Thereafter, the data communication module 1106 may receive (via the receiving module 1104), in response to the report, a switching message from the wireless network 1180 via the first base station 1150 or the second base station 1160. Accordingly, the data communication module 1106 may switch the data communication from the first link to the second link based on the received switching message. The data communication module 1106 may use the signaling information stored in the memory 1114 to communicate with the second base station 1160 when the data communication is switched to the second link.

The apparatus may include additional modules that perform each of the blocks of the algorithm in the aforementioned flow chart of FIG. 10. As such, each block in the aforementioned flow chart of FIG. 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
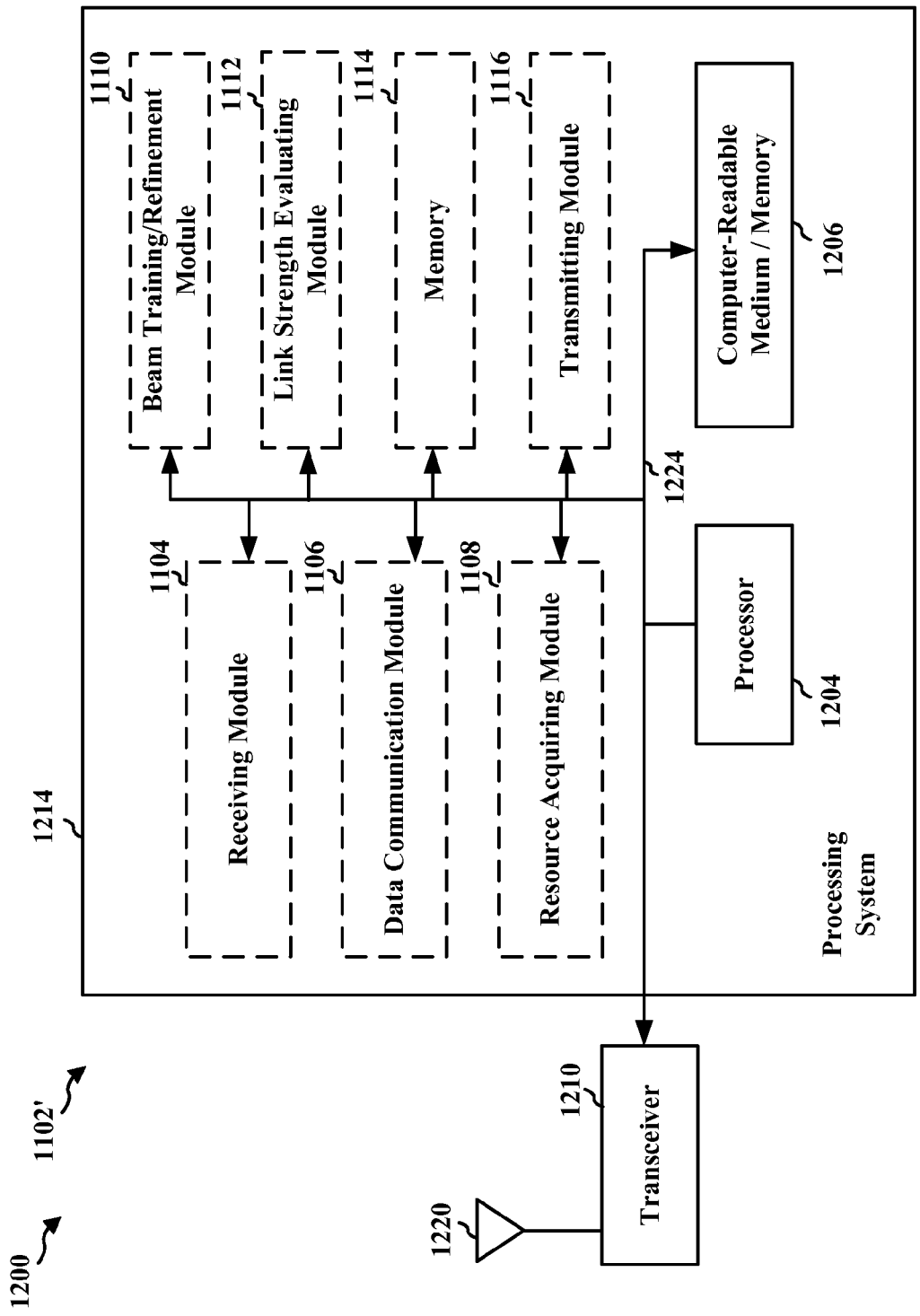
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, 1116, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214, specifically the receiving module 1104. In addition, the transceiver 1210 receives information from the processing system 1214, specifically the transmitting module 1116, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, 1112, 1114, and 1116. The modules may be software modules running in the processor 1204, resident/stored in the computer readable medium/memory 1206, one or more hardware modules coupled to the processor 1204, or some combination thereof. The processing system 1214 may be a component of the UE 350 and may include the memory 360 and/or at least one of the TX processor 368, the RX processor 356, and the controller/processor 359.

In one configuration, the apparatus 1102/1102' for wireless communication includes means for communicating data with the wireless network via a first link with a first base station, means for acquiring a resource to perform a beam training sequence with a second base station, wherein the acquired resource allows the beam training sequence with the second base station to be performed while the data is communicated via the first link, means for performing the beam training sequence and exchanging signaling information with the second base station using the resource to establish a second link to the second base station, means for evaluating a link strength of the second link based on the beam training sequence, means for determining whether to switch the data communication from the first link to the second link based on the evaluation, means for storing the signaling information exchanged with the second base station when the link strength of the second link is above a threshold, and means for using the stored signaling information to communicate with the second base station when the data communication is switched to the second link.

The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of a user equipment (UE) for sustaining a link with a wireless network, comprising:

communicating data with the wireless network via a first link with a first base station;

acquiring a resource to perform a beam training sequence with a second base station, wherein the acquired resource allows the beam training sequence with the second base station to be performed while the data is communicated via the first link;

performing the beam training sequence and exchanging signaling information with the second base station using the resource to establish a second link to the second base station;

evaluating a link strength of the first link based on a beam refinement sequence associated with the first base station;

evaluating a link strength of the second link based on the beam training sequence; and determining whether to switch the data communication from the first link to the second link based on at least one of the evaluation of the link strength of the first link or the evaluation of the link strength of the second link.

2. The method of claim 1, further comprising:

storing the signaling information exchanged with the second base station when the link strength of the second link is above a threshold; and using the stored signaling information to communicate with the second base station when the data communication is switched to the second link.

3. The method of claim 1, further comprising:

performing the beam refinement sequence and exchanging signaling information with the first base station using another resource; and comparing at least one of the link strength of the first link or the link strength of the second link to a threshold, wherein the determination whether to switch the data communication from the first link to the second link is based on the comparison.

4. The method of claim 3, wherein the data communication is switched from the first link to the second link when:

the link strength of the first link is less than the threshold; or the link strength of the second link is greater than the threshold.

5. The method of claim 3, wherein the determining further comprises:

reporting to the wireless network via the first base station or the second base station at least one of the link strength of the first link, the link strength of the second link, or the comparison to the threshold; and receiving, in response to the report, a switching message from the wireless network via the first base station or the second base station, wherein the data communication is switched from the first link to the second link based on the received switching message.

6. The method of claim 3, wherein the beam training sequence and the beam refinement sequence are performed via a single radio.

7. The method of claim 1, wherein the data is communicated with the first base station via the first link while second data is communicated with the second base station via the second link.

8. The method of claim 7, wherein the data received via the first link and the second data received via the second link are combined into a single data stream.

9. The method of claim 7, wherein the data transmitted via the first link and the second data transmitted via the second link are generated from a single data stream.

10. The method of claim 1, wherein the resource is:
at least one of a timeslot or a frequency band; and
acquired via a resource allocation from at least one of the first base station or the second base station, or independently acquired by the UE.

11. A user equipment (UE) for sustaining a link with a wireless network, comprising:
means for communicating data with the wireless network via a first link with a first base station;
means for acquiring a resource to perform a beam training sequence with a second base station, wherein the acquired resource allows the beam training sequence with the second base station to be performed while the data is communicated via the first link;
means for performing the beam training sequence and exchanging signaling information with the second base station using the resource to establish a second link to the second base station;
means for evaluating a link strength of the first link based on a beam refinement sequence associated with the first base station;
means for evaluating a link strength of the second link based on the beam training sequence; and
means for determining whether to switch the data communication from the first link to the second link based on at least one of the evaluation of the link strength of the first link or the evaluation of the link strength of the second link.

12. The UE of claim 11, further comprising:
means for storing the signaling information exchanged with the second base station when the link strength of the second link is above a threshold; and
means for using the stored signaling information to communicate with the second base station when the data communication is switched to the second link.

13. The UE of claim 11, wherein the means for evaluating a link strength of the first link is configured to:
perform the beam refinement sequence and exchange signaling information with the first base station using another resource;
and
the means for determining whether to switch the data communication is configured to compare at least one of the link strength of the first link or the link strength of the second link to a threshold.

14. The UE of claim 13, wherein the data communication is switched from the first link to the second link when:
the link strength of the first link is less than the threshold; or
the link strength of the second link is greater than the threshold.

15. The UE of claim 13, wherein the means for determining is further configured to:
report to the wireless network via the first base station or the second base station at least one of the link strength of the first link, the link strength of the second link, or the comparison to the threshold; and
receive, in response to the report, a switching message from the wireless network via the first base station or the second base station,
wherein the data communication is switched from the first link to the second link based on the received switching message.

16. The UE of claim 13, wherein the beam training sequence and the beam refinement sequence are performed via a single radio.

17. The UE of claim 11, wherein the data is communicated with the first base station via the first link while second data is communicated with the second base station via the second link.

18. The UE of claim 17, wherein the data received via the first link and the second data received via the second link are combined into a single data stream.

19. The UE of claim 17, wherein the data transmitted via the first link and the second data transmitted via the second link are generated from a single data stream.

20. The UE of claim 11, wherein the resource is:
at least one of a timeslot or a frequency band; and
acquired via a resource allocation from at least one of the first base station or the second base station, or independently acquired by the UE.

21. A user equipment (UE) for sustaining a link with a wireless network, comprising:
a memory; and
at least one processor coupled to the memory and configured to:
communicate data with the wireless network via a first link with a first base station,
acquire a resource to perform a beam training sequence with a second base station, wherein the acquired resource allows the beam training sequence with the second base station to be performed while the data is communicated via the first link,
perform the beam training sequence and exchange signaling information with the second base station using the resource to establish a second link to the second base station,
evaluate a link strength of the first link based on a beam refinement sequence associated with the first base station,
evaluate a link strength of the second link based on the beam training sequence, and
determine whether to switch the data communication from the first link to the second link based on at least one of the evaluation of the link strength of the first link or the evaluation of the link strength of the second link.

22. The UE of claim 21, wherein the at least one processor is further configured to:
store the signaling information exchanged with the second base station when the link strength of the second link is above a threshold; and
use the stored signaling information to communicate with the second base station when the data communication is switched to the second link.

23. The UE of claim 21, wherein the at least one processor is further configured to:
perform the beam refinement sequence and exchanging signaling information with the first base station using another resource;
compare at least one of the link strength of the first link or the link strength of the second link to a threshold, wherein the determination whether to switch the data communication from the first link to the second link is based on the comparison.

24. The UE of claim 23, wherein the data communication is switched from the first link to the second link when:
the link strength of the first link is less than the threshold; or
the link strength of the second link is greater than the threshold.

25. The UE of claim 23, wherein the at least one processor is further configured to determine by:

reporting to the wireless network via the first base station or the second base station at least one of the link strength of the first link, the link strength of the second link, or the comparison to the threshold; and receiving, in response to the report, a switching message from the wireless network via the first base station or the second base station, wherein the data communication is switched from the first link to the second link based on the received switching message.

26. The UE of claim 23, wherein the beam training sequence and the beam refinement sequence are performed via a single radio.

27. The UE of claim 21, wherein the data is communicated with the first base station via the first link while second data is communicated with the second base station via the second link.

28. The UE of claim 27, wherein:
the data received via the first link and the second data received via the second link are combined into a single data stream; or
the data transmitted via the first link and the second data transmitted via the second link are generated from a single data stream.

29. The UE of claim 21, wherein the resource is:
at least one of a timeslot or a frequency band; and
acquired via a resource allocation from at least one of the first base station or the second base station, or independently acquired by the UE.

30. A non-transitory computer-readable medium storing computer-executable code for wireless communication by a user equipment (UE), comprising code to:
communicate data with a wireless network via a first link with a first base station;
acquire a resource to perform a beam training sequence with a second base station, wherein the acquired resource allows the beam training sequence with the second base station to be performed while the data is communicated via the first link;
perform the beam training sequence and exchange signaling information with the second base station using the resource to establish a second link to the second base station;
evaluate a link strength of the first link based on a beam refinement sequence associated with the first base station;
evaluate a link strength of the second link based on the beam training sequence; and
determine whether to switch the data communication from the first link to the second link based on at least one of the evaluation of the link strength of the first link or the evaluation of the link strength of the second link.

* * * * *